Jan. 5, 1943.  H. L. GRIFFITH  2,307,263
GAUGING DEVICE
Filed March 29, 1940  2 Sheets-Sheet 1

INVENTOR
HARRY L. GRIFFITH
BY
ATTORNEY

Jan. 5, 1943.  H. L. GRIFFITH  2,307,263
GAUGING DEVICE
Filed March 29, 1940  2 Sheets-Sheet 2

INVENTOR
HARRY L. GRIFFITH
BY
*Hudson, Young, Shanley & Yeager*
ATTORNEY

Patented Jan. 5, 1943

2,307,263

UNITED STATES PATENT OFFICE 2,307,263

GAUGING DEVICE

Harry L. Griffith, Bartlesville, Okla., assignor to Phillips Petroleum Company, a corporation of Delaware.

Application March 29, 1940, Serial No. 326,767

8 Claims. (Cl. 73—298)

This invention relates to a gauging device and more particularly to a valve arrangement for slip tube gauges that are used to determine the volumetric contents or liquid level of various liquids contained in suitable receptacles under superatmospheric pressures. While my instant invention is especially adaptable for use on tank cars that are employed in the transportation of volatile liquids such as liquefied petroleum gas, it will be evident that this device may be employed in connection with slip tube gauges for storage tanks and other types of receptacles containing high pressure liquids.

Slip tube gauges are utilized extensively on tank cars for determining when the car has been filled to a predetermined level with volatile liquids at the loading rack, and also for determining the amount of liquid in the car upon arrival at its destination. These tubes are slidable through an opening in the tank car and are provided at their upper extremity with means for controlling the flow of fluids from the tube to the atmosphere. Such means generally consist of a T-connector mounted on the upper end of the slip tube; a conventional type of needle valve in the end of the T-connector opposite the slip tube end for controlling the passage of fluid through the top of the slip tube; and a pet cock connected to the remaining opening of the T-connector. Experience has shown that this means for shutting off a slip tube is not satisfactory for a number of reasons. First, the pet cock often "freezes" due to the passage of low temperature fluid therethrough with the result that this cock cannot be operated manually. In such cases the person operating the gauge must of necessity remove the entire pet cock and frequently fails to replace the same, either through inadvertence or negligence. Then again many liquids such as liquefied petroleum gas tend to destroy the needle valve gasket lubricant so that it is eventually impossible to obtain a proper and effective seal. This creates a dangerous hazard, especially in cases where the pet cock has been removed. The practice of the present invention eliminates the dangers and objections experienced in the past, and affords a slip tube gauge shut-off device which is entirely satisfactory in every respect.

The primary object of this invention is to provide a slip tube gauge shut-off arrangement which is adapted to be readily operated in a dependable and positive manner.

Another object of this invention is to provide a device of the character indicated through which flow is restricted to a minimum consistent with good operation.

It is a further object of this invention to provide a slip tube gauge shut-off device which is simple in design, inexpensive to manufacture and easy to install.

These and other objects and advantages will be apparent upon reference to the following description and annexed drawings which describe and illustrate a preferred embodiment of my invention; and wherein Figure 1 is an elevation view of the invention installed on a container for volatile liquids such as a tank car or similar receptacle;

Figure 1:
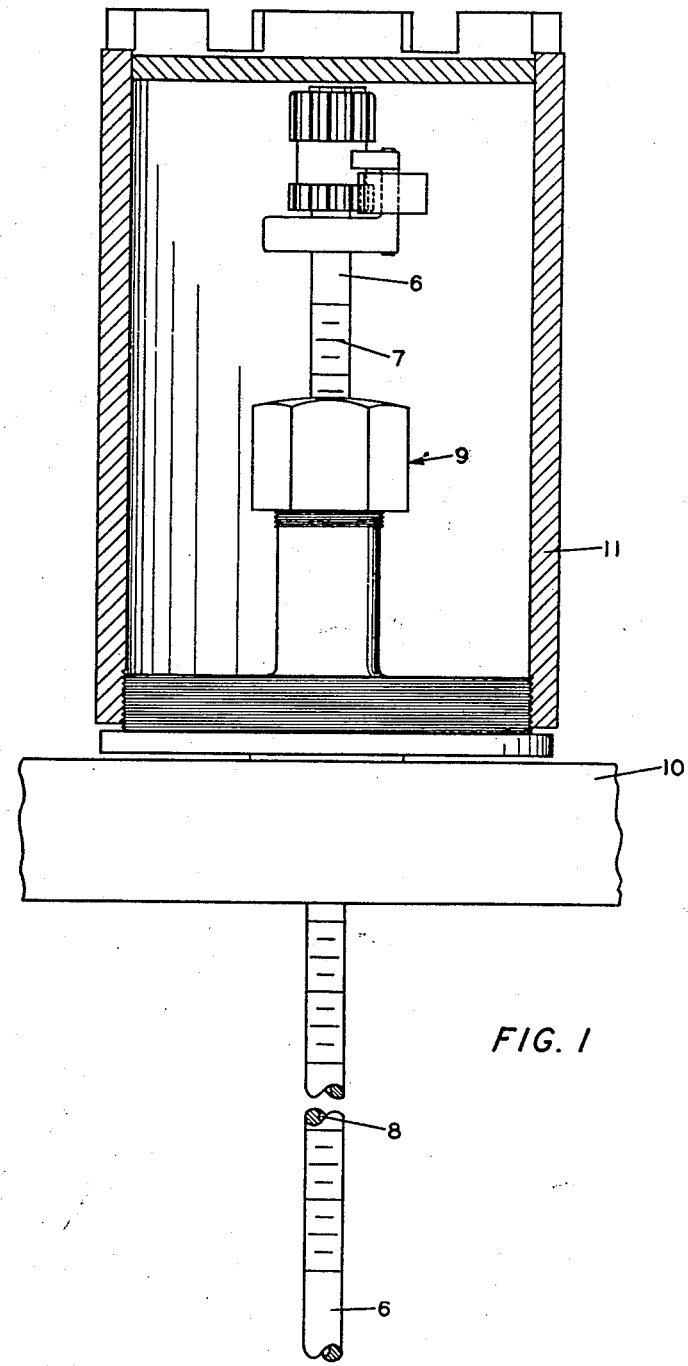

Referring to the drawings, I have denoted therein a conventional type of slip tube 6 having the usual graduations 7 and a central bore 8. The assembly illustrated in Figure 1 shows the slip tube extending through a common form of packing gland unit, generally indicated by reference numeral 9, which is mounted on the top of a tank car or other suitable receptacle 10 for containing volatile liquids. The upper portion of the slip tube and the equipment supported thereon is protected from damage by a removable cover 11 when not in use. It will be observed that the top end of the slip tube is rounded and also that the slip tube is internally and externally threaded at its upper extremity. A hollow plug member 12 having a flow limiting orifice 13 is in threaded engagement with the slip tube. A supporting bracket 14, having a drill hole 15 to receive the slip tube, is firmly affixed to the tube by means of a hollow headed set screw 16. This bracket is provided with an upwardly depending arm 17 which terminates in a sidewardly extending portion 18. Arm 17 is partly cut away at 19 in order to permit a pin 20 to pivotally support a pawl 21 between the upper and lower portions of bracket 14. A coiled "mousetrap" type spring 22 is concentrically mounted on pin 20 and has its ends 23 and 24 bearing against arm 17 and pawl 21, respectively, to normally urge clockwise rotation of pawl 21 about pin 20.

A valve cap 25, which is partly threaded internally to engage with the external threads of tube 6, carries a suitable gasket or valve disc 26 that is preferably composed of a gas resistant synthetic rubber compound such as neoprene. This gasket is employed to seal off the upper end of the slip tube and thereby control the passage of fluid through orifice 13 in the plug member. By rounding off the end of the slip tube, as was indicated earlier in this specification, I provide a smooth gasket seat and thus avoid premature wear and undesirable cutting of the gasket. Additionally, I am able to obtain a better and more effective seal by having a smooth rounded seat. A series of uniform equally spaced notches 27 encircle the lower portion of the valve cap and they are adapted to cooperate with end 28 of the pawl to control the rotation of the valve cap. The valve cap is also provided with a plurality of ribs 29 for gripping the valve cap to actuate the same manually. A valve outlet or passage 30 connects the inside of the valve cap with the atmosphere, and is only sufficiently large in diameter to permit the desired flow of fluids therethrough during the gauging operation. It will be observed on an inspection of Figure 4 that this outlet extends in an outward and downward direction from the interior of the vale cap to protect the operator from coming in contact with extreme temperature fluids. As an additional safeguard, there is provided a hood 31 over the outer end of passage 30. It will also be noted that the inner end of passage 30 is located a short distance below the lower face of gasket 26. The top of the valve cap is provided with a pair of directional arrows 32 and 33 which are preferably cast integral with the cap. It is obvious that these arrows or other indicating means may be stamped, painted or otherwise denoted on the valve cap, as desired. Arrow 32 designates the direction of rotation for closing the valve while arrow 33 indicates the location of outlet passage 30.

My device is assembled by first inserting plug member 12 in slip tube 6. Valve cap 25 is placed upon bracket 14 with the free end of element 18 positioned between notches 27 and ribs 29 and with the interior or inlet opening of the valve cap in alignment with drill hole 15. The bracket and valve cap are next mounted on the slip tube. The cap is turned in the direction of arrow 32 (clockwise) to engage with the external threads on the slip tube and the bracket is then affixed to the slip tube by means of set screw 16. It should be noted that element 18 restricts the upward movement of the valve cap and thus prevents the valve cap from being jarred off or removed by unauthorized persons.

Figure 2:
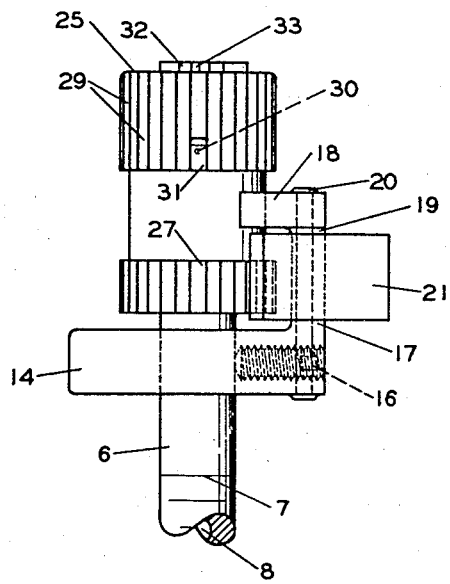
Figure 2 is an enlarged elevation view of the equipment supported by the slip tube in Figure 1.
Figure 3:
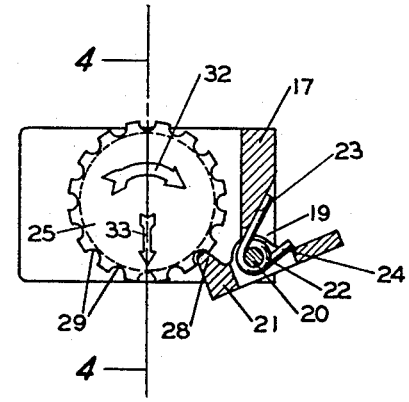
Figure 3 is a plan view of Figure 2, partly in cross section.
Figure 4:
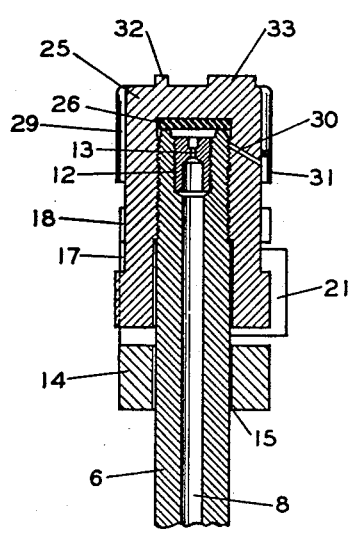
Figure 4 is a central vertical cross section view taken along line 4—4 of Figure 3.
Figure 5:
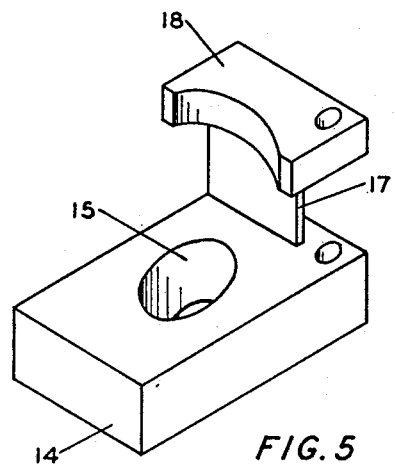
Figure 5 is a perspective view of the supporting bracket employed in this invention.

In describing the operation of this invention, let us first assume that the device has been completely assembled with the various parts in the position illustrated in Figures 2 and 4. Since the valve cap has been turned so that the gasket 26 is seated on the end of slip tube 6, no fluid can pass out of the top of the tube. This is the normal position of the cap when a tank car is in transit or when the contents of a container are not being gauged. By virtue of this arrangement, flow of fluid through my device is prevented by gasket 26, which closes off the upper end of the slip tube, and also by the slip tube itself which covers the inner end of passage 30 when the valve cap is in closed position. Due to the action of spring 22 on pawl 21 which has its engaging end 28 in a notch 27, the valve cap will not become jarred or accidentally turned so as to unseat the gasket. When it is desired to gauge the tank car or other container, the operator merely presses the free end of the pawl against the action of spring 22, thereby releasing the pawl from the valve cap, and simultaneously turns the valve cap in a counter-clockwise direction, unseating the gasket. My design contemplates turning the valve cap several revolutions following the unseating of the gasket before passage 30 is placed in communication with bore 8 through orifice 13 in plug member 12. At such time fluid may pass through the device and to the atmosphere. The hood 31 over the outer end of passage 30 is observed until liquid begins to be emitted thereunder. This serves as a signal to the operator that the liquid in the tank car, or other form of receptacle, has reached the predetermined level.

In a like manner, the device may be utilized to determine the liquid level in containers at any particular time. The slip tube is simply lowered into the container until liquid begins to issue from passage 30 under the hood. The graduations on the slip tube will indicate the position of the liquid level in the receptacle and the volumetric contents of the container can then be readily ascertained.

From the foregoing it is believed that the construction, operation and advantages of my present invention will be fully comprehended by persons skilled in the art. It is to be clearly understood, however, that the form of my invention herewith shown and described is to be taken as a preferred example of the same and that various changes in the shape, size and arrangement of parts may be resorted to without departing from the spirit of the invention as defined by the appended claims.

I claim:

1. A gauging device for volatile liquids comprising a slip tube, a cap cooperating with the tube for controlling the flow of fluid therethrough, a fluid outlet in the cap, said outlet communicating with the tube when the cap is in open position and being covered by the tube when the cap is in closed position, and means for adjustably controlling movement of the cap, said means including a bracket mounted on the tube and bearing a selective cap-engaging element.

2. A gauging device for volatile liquids comprising a slip tube, a flow restricting member in the slip tube, a cap cooperating with the tube for controlling the flow of fluid therethrough, a fluid outlet in the cap, said outlet communicating with the tube when cap is in open position and being covered by the tube when the cap is in closed position, and means including a bracket mounted on the tube, for adjustably controlling movement of the cap.

3. A gauging device for volatile liquids comprising a slip tube, a cap connected to one end of the slip tube for controlling the flow of fluid therethrough, a passage extending from the interior to the exterior of the valve cap, said passage communicating with the tube when the cap is in open position, the inner end of said passage being covered by the tube when the cap is in closed position, and means for controlling movement of the cap, said means mounted on the tube for selectively engaging the cap in the desired degree of opening.

4. A gauging device for volatile liquids comprising a slip tube, a flow restricting plug member in the slip tube, a cap connected to one end of the slip tube for controlling the flow of fluid therethrough, a passage extending from the interior to the exterior of the valve cap, said passage communicating with the tube when the cap is in open position, the inner end of said passage being covered by the tube when the cap is in closed position, and means for adjustably controlling movement of the cap, said means including a bracket mounted on the tube and bearing a selective cap-engaging element.

5. A gauging device for volatile liquids comprising a slip tube, a cap rotatably mounted on the upper end of the slip tube, a fluid outlet in the cap, said outlet communicating with the tube when the cap is in open position and being covered by the tube when the cap is in closed position, means mounted on the tube for controlling rotational movement of the cap about the slip tube, said means including a bracket and means supported thereon for engaging the cap, and means for limiting lineal movement of the cap with respect to the slip tube.

6. A gauging device for volatile liquids comprising a slip tube, a cap rotatably mounted on the upper end of the slip tube, a fluid outlet in the cap, said outlet communicating with the tube when the cap is in open position and being covered by the tube when the cap is in closed position, a plurality of spaced notches on the outer peripheral surface of the cap, means mounted on the tube for controlling rotational movement of the cap about the slip tube, said means including a bracket and a spring pressed pawl supported thereon for normally engaging a notch on the cap, and means for limiting lineal movement of the cap with respect to the slip tube.

7. A gauging device for volatile liquids comprising a slip tube, a cap rotatably mounted on the upper end of the slip tube, a fluid outlet in the cap, said outlet communicating with the tube when the cap is in open position and being covered by the tube when the cap is in closed position, means for controlling rotational movement of the cap about the slip tube, a bracket connected to the slip tube below the cap, an upwardly depending arm carried by the bracket, and a member extending inwardly of the arm, said member cooperating on contact with the cap to limit lineal movement of the same with respect to the slip tube.

8. A gauging device for volatile liquids comprising a slip tube, a cap rotatably mounted on the upper end of the slip tube, a fluid outlet in the cap, said outlet communicating with the tube when the cap is in open position and being covered by the tube when the cap is in closed position, a plurality of spaced notches on the outer peripheral surface of the cap, a bracket adjustably supported on the slip tube, a spring pressed pawl pivotally connected to the bracket for normally engaging a notch on the cap, an upwardly depending arm carried by the bracket, and a member extending inwardly of the arm, said member cooperating with the cap upon contact therewith to limit lineal movement of the same with respect to the slip tube.

HARRY L. GRIFFITH.

CERTIFICATE OF CORRECTION.

Patent No. 2,307,263. January 5, 1943.

HARRY L. GRIFFITH.

It is hereby certified that error appears in the printed specification of the above numbered patent requiring correction as follows: Page 2, first column, line 25, for "vale" read --valve--; page 2, second column, lines 63 and 64, after the words "and means" strike out "for controlling movement of the cap, said means"; and that the said Letters Patent should be read with this correction therein that the same may conform to the record of the case in the Patent Office.

Signed and sealed this 9th day of March, A. D. 1943.

(Seal)

Henry Van Arsdale,
Acting Commissioner of Patents.